United States Patent [19]

Manitakos

[11] Patent Number: 5,379,134
[45] Date of Patent: Jan. 3, 1995

[54] HOLOGRAPHIC DISK MOUNTING SYSTEM AND METHOD

[75] Inventor: Daniel L. Manitakos, Haverhill, Mass.

[73] Assignee: Miles Inc., Wilmington, Mass.

[21] Appl. No.: 102,318

[22] Filed: Aug. 5, 1993

Related U.S. Application Data

[63] Continuation of Ser. No. 899,059, Jun. 16, 1992, abandoned, which is a continuation of Ser. No. 815,572, Dec. 26, 1991, abandoned, which is a continuation of Ser. No. 698,238, May 6, 1991, abandoned, which is a continuation of Ser. No. 560,236, Jul. 23, 1990, abandoned, which is a continuation of Ser. No. 196,867, May 20, 1988, abandoned, which is a continuation of Ser. No. 859,061, May 2, 1986, abandoned.

[51] Int. Cl.6 .......................... G02B 5/32; G02B 26/10
[52] U.S. Cl. ........................................ 359/17; 359/18; 359/209
[58] Field of Search ................ 350/3.71, 6.9; 411/147, 411/37; 359/17, 18, 209, 210

[56] References Cited

U.S. PATENT DOCUMENTS

| | | | |
|---|---|---|---|
| 2,247,959 | 7/1941 | McComb | 411/147 |
| 3,503,430 | 3/1970 | Tsurumoto | 411/147 |
| 3,906,264 | 9/1975 | Kuwako et al. | 310/51 |
| 4,067,639 | 1/1978 | Kramer | 350/6.9 |
| 4,185,214 | 1/1980 | Gerber et al. | 310/51 |
| 4,556,278 | 12/1985 | Schell | 350/3.71 |

FOREIGN PATENT DOCUMENTS

| | | | |
|---|---|---|---|
| 60-172015 | 9/1985 | Japan | 350/3.71 |
| 60-172016 | 9/1985 | Japan | 350/3.71 |

*Primary Examiner*—Martin Lerner
*Attorney, Agent, or Firm*—Richard J. Birch

[57] ABSTRACT

A holographic disk mounting system and method is disclosed utilizing a compressible O-ring which eliminates the clearance between the spin motor shaft and the holographic disk. The holographic disk has an axial bore with a diameter slightly greater than the diameter of the spin motor shaft. A compressible O-ring is placed around the spin motor shaft and then the holographic disk is mounted thereon with the O-ring and O-ring surrounded portion of the spin motor shaft positioned within the axial bore of the holographic disk. The O-ring is axially compressed to radially expand the O-ring thereby eliminating the clearance between the spin motor shaft and the bore of the holographic disk. Thereafter, the holographic disk is secured to the motor shaft with the O-ring remaining in a compressed state.

14 Claims, 2 Drawing Sheets

HOLOGRAPHIC DISK MOUNTING SYSTEM AND METHOD

This application is a continuation of application Ser. No. 07/899,059, filed Jun. 16, 1992, and now abandoned; which is a continuation of application Ser. No. 07/815,572, filed Dec. 26, 1991, and now abandoned; which is a continuation of application Ser. No. 07/698,238, filed May 6, 1991, and now abandoned; which is a continuation of application Ser. No. 07/560,236, filed Jul. 23, 1990, and now abandoned; which is a continuation of application Ser. No. 07/196,867, filed May 20, 1988, and now abandoned; which is a continuation of application Ser. No. 06/859,061, filed May 2, 1986, and now abandoned.

BACKGROUND OF THE INVENTION

The present invention relates to holographic disk mounting systems and, more particularly, to a method and apparatus for mounting a holographic disk on a spin motor shaft which utilizes the radial expansion of an axially compressed O-ring to eliminate clearance between the holographic disk and spin motor shaft.

Holographic spinners are used for scanning a laser beam across a surface for purposes of writing or reading. The rapidly spinning holographic disk imposes a number of constraints upon the designer. The disk must be maintained in accurate perpendicular alignment with the axis of rotation and must also have zero radial play in order to preserve dynamic balance of the assembly. Various holographic disk mounting systems have been proposed in the art. For example, U.S. Pat. No. 4,353,615 discloses a dynamic mounting system for holographic spinners utilizing a self-aligning bearing while U.S. Pat. No. 4,556,278 discloses a free-floating mount for a holographic disk. In both patents, the centrifugal force developed by rotation of the disk is employed to align the disk with the axis of rotation. In each case, the mounting systems are relatively complex and, therefore, expensive.

It is, accordingly, a general object of the present invention to provide an improved method and mounting system for holographic disks.

It is a specific object of the invention to provide a holographic disk mounting system and method that provides precise perpendicular alignment of the disk to the axis of rotation while achieving zero radial play.

It is another object of the present invention that the mounting system imposes minimum stresses in the holographic disk.

It is a still further object of the present invention to provide a method and apparatus for holographic disk mounting which permits positive, repeatable disk alignment.

It is a feature of the invention that the mounting system utilizes inexpensive simple parts to achieve the desired objectives of precise perpendicular alignment and zero radial play.

It is another feature of the invention that the mounting system can be used over a wide range of temperatures.

SUMMARY OF THE INVENTION

The invention utilizes the radial expansion of an axially compressed O-ring positioned in the axial bore of the holographic disk and around the motor shaft to eliminate play between the motor shaft and holographic disk. The holographic disk is secured to the motor shaft with the compressed O-ring remaining in its compressed state.

DETAILED DESCRIPTION OF THE INVENTION

Figure 1:
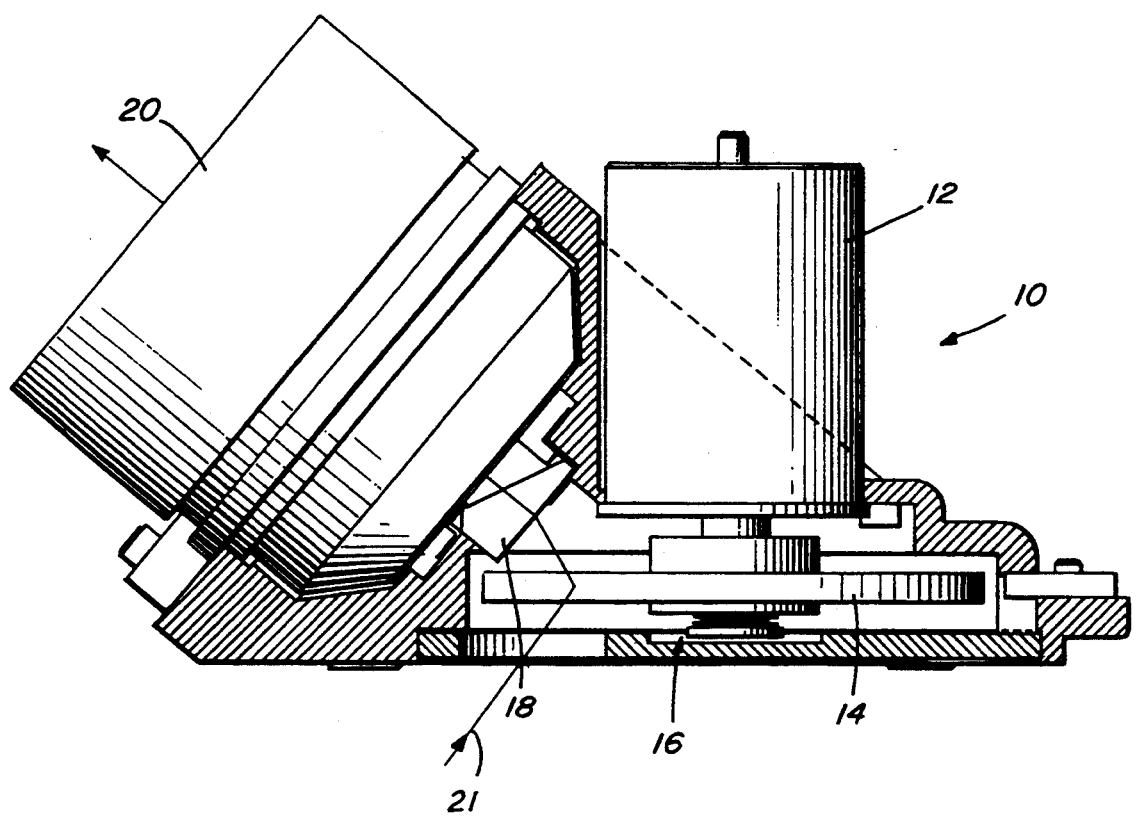
Figure 2:
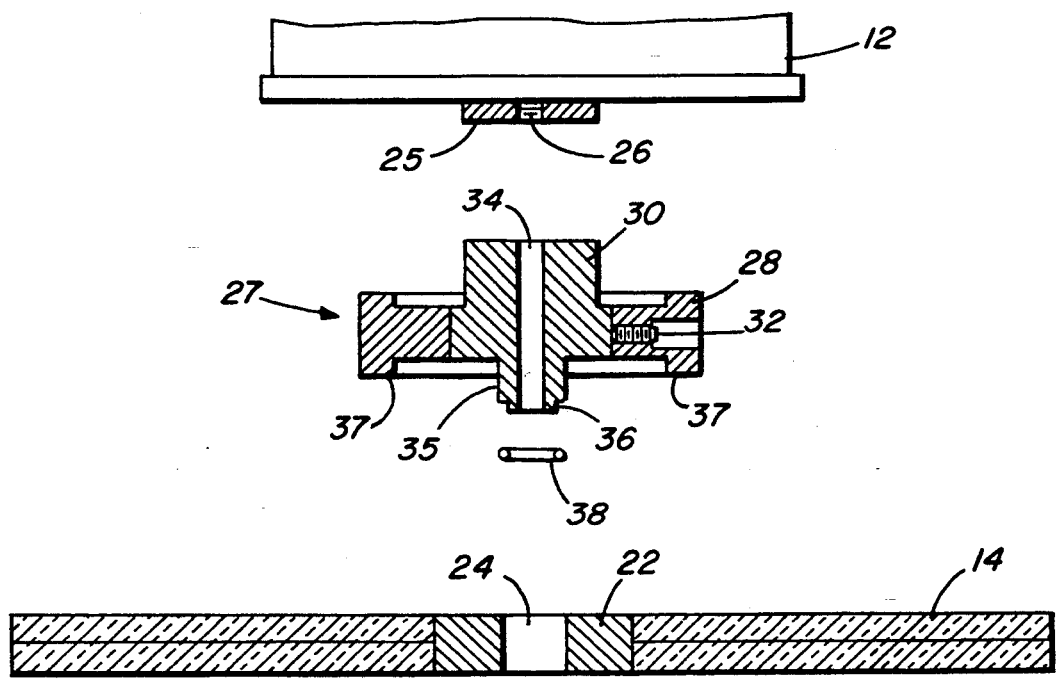
Figure 2:
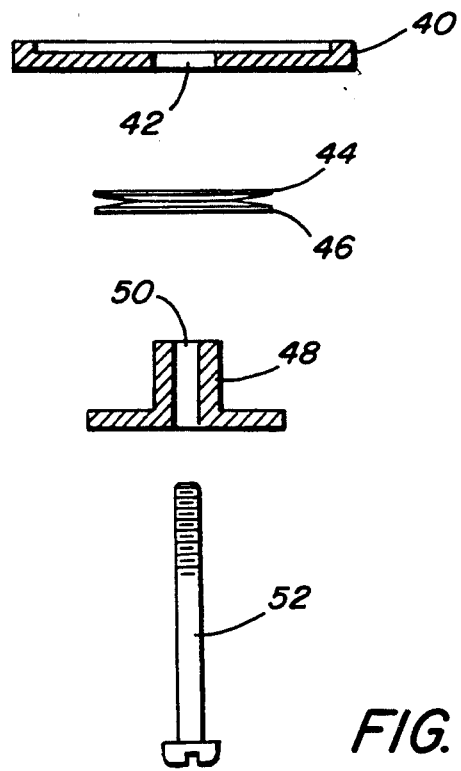

The objects and features set forth above and other objects and features of the invention will best be understood from a detailed description of a preferred embodiment thereof, selected for purposes of illustration and shown in the accompanying drawings in which:

FIG. 1 is a view in partial section of a holographic deflector assembly showing the spin motor, rotatable holographic disk and optical assembly; and, FIG. 2 is an exploded view in partial section showing the spin motor, holographic disk and mounting assembly components.

Turning now to the drawings, a holographic deflector assembly indicated generally by the reference numeral 10 comprises a housing 11, a spin motor 12, a holographic disk 14 having at least one holographic facet, a disk mounting assembly 16 (shown in greater detail in FIG. 2), and an optical system formed by prism 18 and lens 20. A laser beam 21 is deflected in a known manner by the holographic planar disk holographic facet(s) to produce a scanning locus for the laser beam that is focused by lens 20 upon a scanning surface (not shown).

Referring now to FIG. 2, the holographic disk 14 has a fixed disk center bushing 22 which defines a bore 24. The spin motor 12 has a rotating shaft 25 that includes a threaded bore 26, the purpose of which will be described subsequently. Connection of the holographic planar disk 14 to the rotating shaft 25 of the spin motor is accomplished by means of an intermediate hub assembly 27. The hub assembly 27 comprises an outer sleeve 28 press fitted on an inner hub 30 and one or more set screws 32 that are employed to dynamically balance the rotating elements. Hub 30 contains a through bore 34, the lower end of the which, as viewed in FIG. 2, extends through an annular shaft portion 35 that terminates in a reduced diameter or shoulder portion 36. The diameter of shaft portion 35 is slightly less than the diameter of the holographic disk bushing bore 24. The clearance between hub shaft 35 and the holographic disk bore 24 is necessary so that the holographic disk can be fitted onto the shaft 35 and seated fully against the hub assembly annular reference surface 37 without restraint from the bore 24. The plane of the reference surface 37 is normal to the rotational axis of the spin motor shaft 25. This relationship can be achieved either by finish machining after attachment of the hub assembly to the spin motor shaft or by making the plane of reference surface 37 perpendicular to the longitudinal axis of bore 34. This arrangement permits the accurate perpendicular registration of the holographic disk with respect to the rotational axis.

A compressible O-ring 38 is positioned around the reduced diameter end portion 36 of the hub shaft 35 and then the holographic disk is mounted on hub shaft 35 with the planar surface of the holographic disk in contact with the planar reference surface 37. A thrust ring 40 having a bore 42 is placed against the outer or lower, as viewed in FIG. 2, surface of the holographic disk 14 and two Belleville type spring disk washers 44 and 46 are placed around a cap lock 48 having a bore 50. Screw 52 is then inserted through bore 50, the disk spring washers 44 and 46, bore 42 of the thrust ring 40 and, finally, through holographic disk bore 24, O-ring 38, hub bore 34 and into the threaded bore 26 of the motor shaft.

It will be appreciated that as screw 52 is tightened, springs 44 and 46 are compressed forcing the thrust ring 40 against the outer surface of the holographic planar disk which in turn seats the disk against the planar reference surface 37 of the hub assembly 27. The spring rates of springs 44 and 46 can be selected to tune the vibrational response of the rotating holographic disk assembly and to control the load on the glass of the holographic disk.

Since the axial compression of the O-ring 38 produces the radial expansion of the O-ring that eliminates the clearance between the hub shaft 35 and the holographic disk bushing bore 24, it will be understood that the O-ring cannot take a set. A variety of conventional materials can be employed to form the O-ring. One suitable material is nitrile (Buna-N (elastomer durometer 65–75 shore A).

From the preceding discussion of the mounting system and method of the present invention, it will be appreciated that the hub assembly 27 and, specifically, the shaft 35, reduced diameter end portion 36 and reference surface 37, can be formed as a single element and, if desired, as an integral part of the motor shaft 25. Alternatively motor shaft 25 and hub 30 can be formed integrally with a separate sleeve 28 secured to the motor shaft 25.

Other modifications can also be made without departing from the scope of the invention as defined in the following claims.

What I claim and desire to secure by Letters Patent of the United States is:

1. A holographic deflector assembly comprising:
   (a) a rotatable shaft having means defining a planar disk reference surface the plane of which is normal to the longitudinal axis of the rotatable shaft;
   (b) holographic planar disk means having an axial bore the diameter of which is greater than the diameter of said rotatable shaft, said holographic planar disk means being mounted on the rotatable shaft and in contact with the planar reference surface thereof;
   (c) an O-ring positioned around said rotatable shaft and in the axial bore of said holographic planar disk means with clearance between said O-ring and the axial bore of the holographic planar disk means;
   (d) means for securing the holographic planar disk means to the rotatable shaft, said securing means including means for axially compressing said O-ring to produce sufficient radial expansion thereof to eliminate the clearance between said O-ring and the bore of said holographic planar disk means.

2. A holographic deflector assembly comprising:
   (a) spin motor means including a rotatable shaft having an annular shaft portion and means defining a planar disk reference surface the plane of which is normal to the longitudinal axis of the rotatable shaft;
   (b) holographic planar disk means having an axial bore the diameter of which is greater than the diameter of the annular shaft portion of said rotatable shaft, said holographic planar disk means being mounted on the rotatable shaft and in contact with the planar reference surface thereof;
   (c) an O-ring positioned around the annular shaft portion of said rotatable shaft and in the axial bore of said holographic planar disk means with a clearance between said O-ring and the axial bore of the holographic planar disk means; and,
   (d) means for securing the holographic planar disk means to the rotatable shaft, said securing means including means for axially compressing said O-ring to produce sufficient radial expansion thereof to eliminate the clearance between said O-ring and the bore of said holographic planar disk means.

3. The holographic deflector assembly of claim 2 wherein said means for axially compressing said O-ring includes spring means.

4. The holographic deflector assembly of claim 3 wherein said spring means are opposed disk spring washers.

5. The holographic deflector assembly of claim 2 wherein the annular shaft portion of said rotatable shaft terminates in a reduced diameter end portion and wherein said O-ring is positioned around said reduced diameter end portion.

6. The holographic deflector assembly of claim 2 wherein the hub means annular shaft terminates in a reduced diameter end portion and wherein said O-ring is positioned around said reduced diameter end portion.

7. A holographic deflector assembly comprising:
   (a) spin motor means having a rotatable shaft;
   (b) hub means having an annular shaft and means defining a planar disk reference surface the plane of which is normal to the longitudinal axis of the annular shaft;
   (c) holographic planar disk means having an axial bore the diameter of which is greater than the diameter of said hub means annular shaft, said holographic planar disk means being mounted on the annular shaft and in contact with the planar reference surface of said hub means;
   (d) an O-ring positioned around said hub means annular shaft and in the axial bore of said holographic planar disk means with a clearance between said O-ring and the axial bore of said holographic disk means; and,
   (e) means for securing the hub means and holographic planar disk means to the rotatable shaft of said spin motor means with the plane of said hub means reference surface being normal to the longitudinal axis of said rotatable shaft, said securing means including means for axially compressing said O-ring to produce sufficient radial expansion thereof to eliminate the clearance between said O-ring and the bore of said holographic planar disk means.

8. The holographic deflector assembly of claim 7 wherein said means for axially compressing said O-ring includes spring means.

9. The holographic deflector assembly of claim 8 wherein said spring means are opposed disk spring washers.

10. A method for mounting a holographic planar disk with an axial bore on a rotatable annular shaft having a diameter less than the diameter of the holographic planar disk axial bore and having a planar disk reference surface the plane of which is normal to the longitudinal axis of the rotatable annular shaft, said method comprising the steps of:
    (a) placing a compressible O-ring on the rotatable annular shaft;
    (b) placing the rotatable annular shaft, O-ring and holographic planar disk means together so that the O-ring and O-ring surrounded portion of the rotatable shaft are located with radial clearance within the axial bore of the holographic planar disk and with the holographic planar disk in contact with the planar disk reference surface;

(c) axially compressing said O-ring to cause radial expansion thereof that is sufficient to eliminate the clearance between the O-ring and the holographic planar disk means; and, (d) securing the holographic planar disk means to the rotatable annular shaft with the O-ring maintained in its compressed state.

11. The method of claim 10 further comprising the step of placing said holographic planar disk under spring tension against said planar disk reference surface.

12. The method of claim 11 further comprising the step of controlling the tension on said holographic planar disk by selecting a spring rate.

13. The method of claim 11 further comprising the step of tuning the vibrational response of the rotating elements by selecting a total spring load on the holographic planar disk.

14. A holographic deflector assembly comprising:
(a) a rotatable shaft having means defining a planar disk reference surface the plane of which is normal to the longitudinal axis of the rotatable shaft;
(b) holographic planar disk means having an axial bore the diameter of which is greater than the diameter of said rotatable shaft, said holographic planar disk means being mounted on the rotatable shaft and in contact with the planar reference surface thereof;
(c) an O-ring positioned around said rotatable shaft and located within the axial bore of said holographic planar disk means with clearance between said O-ring and the axial bore of the holographic planar disk means;
(d) means for securing the holographic planar disk means to the rotatable shaft, said securing means including means for axially compressing said O-ring to produce sufficient radial expansion thereof to eliminate the clearance between said O-ring and the bore of said holographic planar disk means.

* * * * *